United States Patent [19]
Brady et al.

[11] Patent Number: 5,791,010
[45] Date of Patent: Aug. 11, 1998

[54] HEATED WINDSHIELD WIPER

[76] Inventors: William E. Brady, Formington Ave., P.O. Box 113, Boyertown, Pa. 19512; Richard Ziegler, 3061 New Hanover Q Rd., Gilbertsville, Pa. 19525

[21] Appl. No.: 974,048

[22] Filed: Nov. 19, 1997

[51] Int. Cl.⁶ ................................. B60S 1/38; B60S 1/04
[52] U.S. Cl. ........................... 15/250.07; 15/250.44; 215/202
[58] Field of Search ................ 15/250.07, 250.05, 15/250.48, 250.08, 250.361, 250.44; 219/202, 203

[56] References Cited

U.S. PATENT DOCUMENTS

| | | | |
|---|---|---|---|
| 2,627,011 | 1/1953 | Eaves | 15/250.07 |
| 2,786,224 | 3/1957 | Dembosky | 15/250.08 |
| 2,790,194 | 4/1957 | Norine | 15/250.07 |
| 5,412,177 | 5/1995 | Clark | 15/250.07 |

FOREIGN PATENT DOCUMENTS 707471   4/1965   Canada ..................... 15/250.08

Primary Examiner—Gary K. Graham

[57] ABSTRACT

A new HEATED WINDSHIELD WIPER for melting snow and ice accumulation off of the windshield wipers of a vehicle. The inventive device includes a wiper arm having an elongate main articulation bow and a pair of elongate carrier bows each pivotally coupled to one of a pair of spaced apart a pivot mounts on the main articulation bow. The wiper arm also includes a wiper blade is mounted to the pair of carrier bows. A heating member having a elongate heating element and an elongate reflector is located between the pivot mounts of the main articulation bow so that the heating member is interposed between the main articulation bow and the wiper blade. The heating element is also spaced apart from the wiper blade so that the reflector is interposed between the main articulation bow and the heating element.

9 Claims, 2 Drawing Sheets

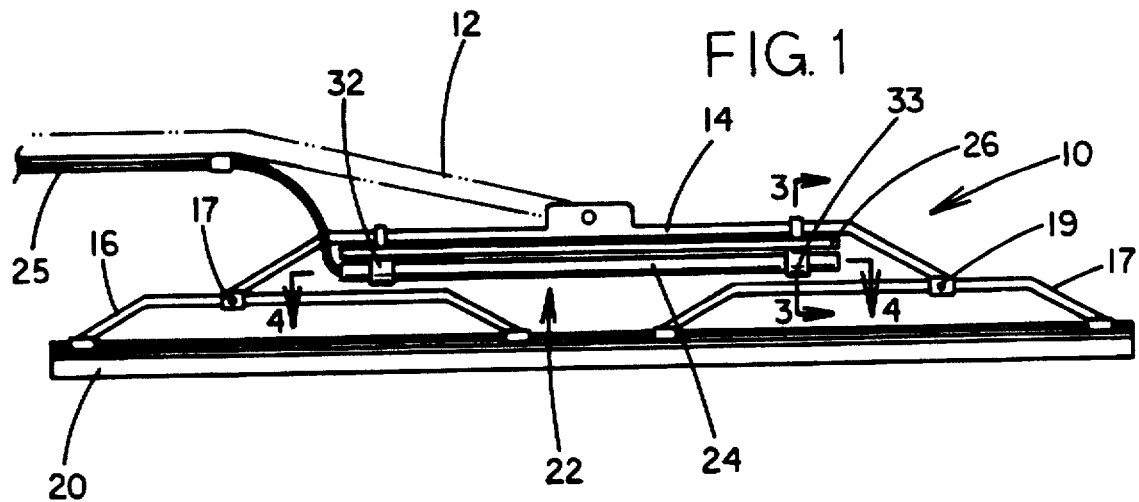
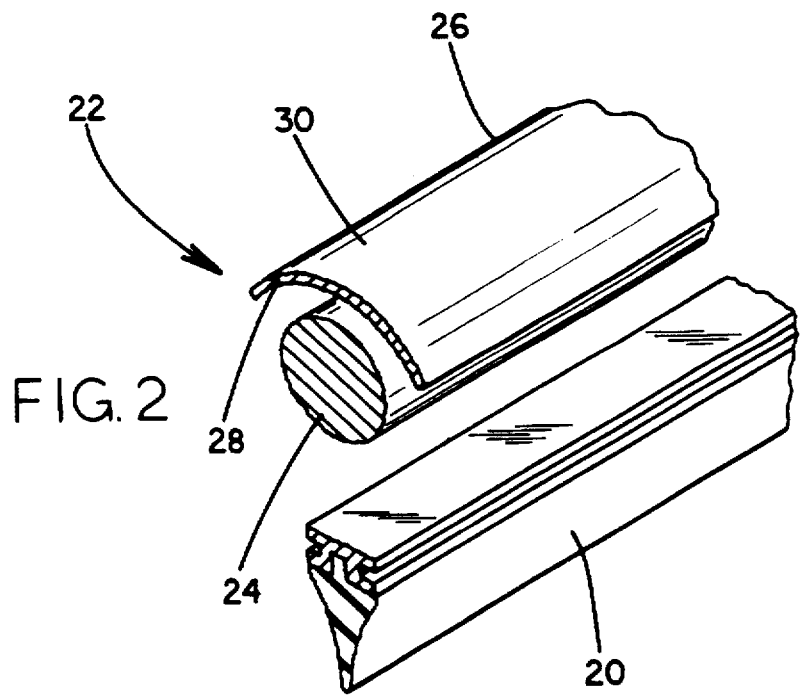

5,791,010

HEATED WINDSHIELD WIPER

BACKGROUND OF THE INVENTION

1. Field of the Invention

The present invention relates to heated windshield wipers and more particularly pertains to a new heated windshield wiper for melting snow and ice accumulation off of the windshield wipers of a vehicle.

2. Description of the Prior Art

The use of heated windshield wipers is known in the prior art. More specifically, heated windshield wipers heretofore devised and utilized are known to consist basically of familiar, expected and obvious structural configurations, notwithstanding the myriad of designs encompassed by the crowded prior art which have been developed for the fulfillment of countless objectives and requirements.

Known prior art heated windshield wipers include U. S. Pat. No. 4,670,933; U.S. Pat. No. 4,928,345; U.S. Pat. No. 5,325,561; U.S. Pat. No. 4,928,344; U.S. Pat. No. 5,426,814; and U.S. Pat. No. Des. 341,115.

While these devices fulfill their respective, particular objectives and requirements, the aforementioned patents do not disclose a new heated windshield wiper. The inventive device includes a wiper arm having an elongate main articulation bow and a pair of elongate carrier bows each pivotally coupled to one of a pair of spaced apart a pivot mounts on the main articulation bow. The wiper arm also includes a wiper blade is mounted to the pair of carrier bows. A heating member having a elongate heating element and an elongate reflector is located between the pivot mounts of the main articulation bow so that the heating member is interposed between the main articulation bow and the wiper blade. The heating element is also spaced apart from the wiper blade so that the reflector is interposed between the main articulation bow and the heating element.

In these respects, the heated windshield wiper according to the present invention substantially departs from the conventional concepts and designs of the prior art, and in so doing provides an apparatus primarily developed for the purpose of melting snow and ice accumulation off of the windshield wipers of a vehicle.

SUMMARY OF THE INVENTION

In view of the foregoing disadvantages inherent in the known types of heated windshield wipers now present in the prior art, the present invention provides a new heated windshield wiper construction wherein the same can be utilized for melting snow and ice accumulation off of the windshield wipers of a vehicle.

The general purpose of the present invention, which will be described subsequently in greater detail, is to provide a new heated windshield wiper apparatus and method which has many of the advantages of the heated windshield wipers mentioned heretofore and many novel features that result in a new heated windshield wiper which is not anticipated, rendered obvious, suggested, or even implied by any of the prior art heated windshield wipers, either alone or in any combination thereof.

To attain this, the present invention generally comprises a wiper arm having an elongate main articulation bow and a pair of elongate carrier bows each pivotally coupled to one of a pair of spaced apart a pivot mounts on the main articulation bow. The wiper arm also includes a wiper blade is mounted to the pair of carrier bows. A heating member having a elongate heating element and an elongate reflector is located between the pivot mounts of the main articulation bow so that the heating member is interposed between the main articulation bow and the wiper blade. The heating element is also spaced apart from the wiper blade so that the reflector is interposed between the main articulation bow and the heating element.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new heated windshield wiper apparatus and method which has many of the advantages of the heated windshield wipers mentioned heretofore and many novel features that result in a new heated windshield wiper which is not anticipated, rendered obvious, suggested, or even implied by any of the prior art heated windshield wipers, either alone or in any combination thereof.

It is another object of the present invention to provide a new heated windshield wiper which may be easily and efficiently manufactured and marketed.

It is a further object of the present invention to provide a new heated windshield wiper which is of a durable and reliable construction.

An even further object of the present invention is to provide a new heated windshield wiper which is susceptible of a low cost of manufacture with regard to both materials and labor, and which accordingly is then susceptible of low prices of sale to the consuming public, thereby making such heated windshield wiper economically available to the buying public.

Still yet another object of the present invention is to provide a new heated windshield wiper which provides in the apparatuses and methods of the prior art some of the advantages thereof, while simultaneously overcoming some of the disadvantages normally associated therewith.

Still another object of the present invention is to provide a new heated windshield wiper for melting snow and ice accumulation off of the windshield wipers of a vehicle.

Yet another object of the present invention is to provide a new heated windshield wiper which includes a wiper arm having an elongate main articulation bow and a pair of elongate carrier bows each pivotally coupled to one of a pair of spaced apart a pivot mounts on the main articulation bow. The wiper arm also includes a wiper blade is mounted to the pair of carrier bows. A heating member having a elongate heating element and an elongate reflector is located between the pivot mounts of the main articulation bow so that the heating member is interposed between the main articulation bow and the wiper blade. The heating element is also spaced apart from the wiper blade so that the reflector is interposed between the main articulation bow and the heating element.

Still yet another object of the present invention is to provide a new heated windshield wiper that includes a reflector for focusing heat towards the wipe blade of the windshield wiper.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new heated windshield wiper according to the present invention.

FIG. 2 is a schematic breakaway perspective view of the heating member and the wiper blade of the present invention.

DESCRIPTION OF THE PREFERRED EMBODIMENT

Figure 3:
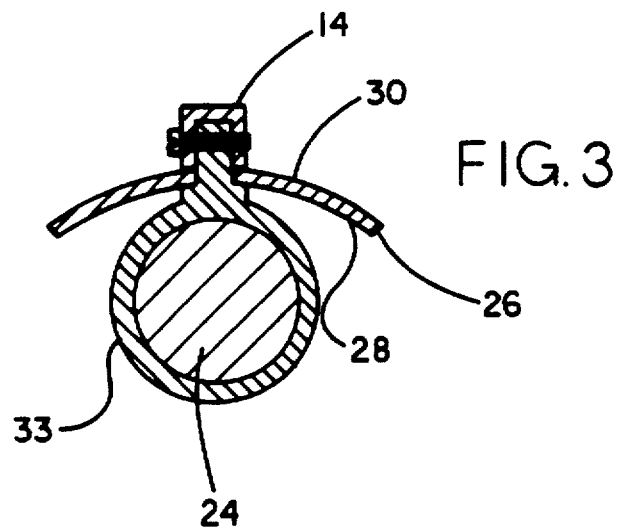
FIG. 3 is a schematic cross section view of the present invention taken from line 3—3 on FIG. 1.
Figure 4:
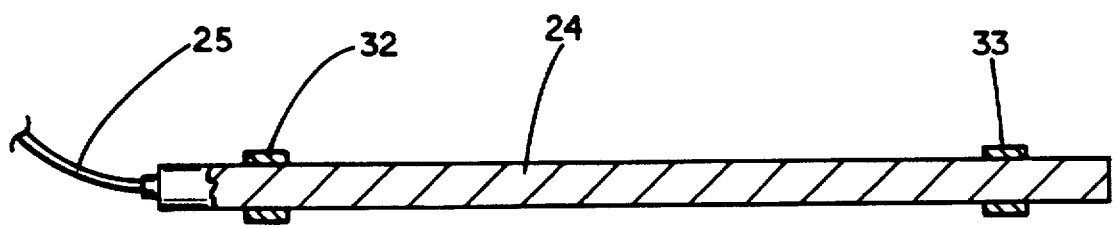
FIG. 4 is a schematic cross section view of the present invention taken from line 4—4 on FIG. 1

With reference now to the drawings, and in particular to FIGS. 1 through 4 thereof, a new heated windshield wiper embodying the principles and concepts of the present invention and generally designated by the reference numeral 10 will be described.

As best illustrated in FIGS. 1 through 4, the heated windshield wiper 10 is designed for use on the front windshield of a vehicle. The heated windshield wiper 10 generally comprises a wiper arm 12 having an elongate main articulation bow 14 and a pair of elongate carrier bows 16,17 each pivotally coupled to one of a pair of spaced apart a pivot mounts 18,19 on the main articulation bow 14. The wiper arm also includes a wiper blade 20 is mounted to the pair of carrier bows 16,17. A heating member 22 having a elongate heating element 24 and an elongate reflector 26 is located between the pivot mounts 18,19 of the main articulation bow 14 so that the heating member 22 is interposed between the main articulation bow 14 and the wiper blade 20. The heating element 22 is also spaced apart from the wiper blade 20 so that the reflector 26 is interposed between the main articulation bow 14 and the heating element 24.

Preferably, the heating element 24 of the heating member is cylindrical. The heating element 24 provides sufficient heat to melt snow and ice on the wiper blade 20 when powered. Ideally, the heating element 24 is electrically coupled to a power source of a vehicle (not shown) by a connecting wire 25. Ideally, the heating element 24 includes a coating designed for preventing electrical shorts when exposed to water.

Preferably, the reflector 26 has a concave inner surface 28 and a convex outer surface 30. As shown in FIG. 2, the reflector 26 is spaced apart from the heating element 24 such that the concave inner surface 28 faces the heating element 24. The concave inner surface 28 is designed for reflecting heat from the heating element 24 towards the wiper blade 20. Ideally, the reflector is constructed from aluminum or a heat resistant plastic material with a reflective material on the inner surface 28.

The heating member 22 is preferably coupled to the main articulation bow 14 by a pair of spaced apart mounting brackets 32,33 that are, ideally, heat resistant insulated. The mounting brackets are detachably coupled to the main articulation bow 14 to permit replacement and servicing of the heating member 22.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A heated windshield wiper, comprising:
    a wiper arm having an elongate main articulation bow, a pair of elongate carrier bows, and an elongate wiper blade, said main articulation bow having a pair of spaced apart pivot mounts, a first of said carrier bows being pivotally coupled to a first of said pivot mounts, a second of said carrier bows being pivotally coupled to a second of said pivot mounts, said wiper blade being mounted to said pair of carrier bows;
    a heating member having a elongate heating element, an elongate reflector and coupling means mounting said element and reflector on said main bow;
    said reflector having an inner surface and an outer surface, said reflector being spaced apart from said heating element, said inner surface of said reflector facing said heating element;
    said heating member being located between said pivot mounts of said main articulation bow, said heating member being interposed between said main articulation bow and said wiper blade, said heating element being spaced apart from said wiper blade, said reflector being interposed between said main articulation bow and said heating element; and said inner surface of said reflector being for reflecting heat from the healing element towards said wiper blade.

2. The heated windshield wiper of claim 1, wherein said heating element is cylindrical.

3. The heated windshield wiper of claim 1, wherein said coupling means comprises a pair of mounting brackets, said mounting brackets of said heating member being coupled to said main articulation bow of said wiper arm.

4. The heated windshield wiper of claim 3, wherein said mounting brackets of said heating member are detachably coupled to said main articulation bow of said wiper arm.

5. The heated windshield wiper of claim 1, wherein said heating element is electrically coupled to a power source of a vehicle, and wherein said heating element provides heat sufficient to melt snow and ice on said wiper blade when powered.

6. The heated windshield wiper of claim 5, wherein said heating element has a coating for preventing electrical shorts when exposed to water.

7. The heated windshield wiper of claim 1, wherein said inner surface of said reflector is concave and said outer surface of said reflector is convex.

8. The heated windshield wiper of claim 7, wherein said reflector comprises aluminum.

9. A heated windshield wiper, comprising:

a wiper arm having an elongate main articulation bow, a pair of elongate carrier bows, and an elongate wiper blade, said main articulation bow having a pair of spaced apart pivot mounts, a first of said carrier bows being pivotally coupled to a first of said pivot mounts, a second of said carrier bows being pivotally coupled to a second of said pivot mounts, said wiper blade being mounted to said pair of carrier bows;

a heating member having a cylindrical elongate heating element, an elongate reflector, and a pair of mounting brackets engaged with said heating element and said reflector;

said heating element being electrically coupled to a power source of a vehicle;

said reflector having a concave inner surface and a convex outer surface, said reflector being spaced apart from said heating element, said concave inner surface of said reflector facing said heating element;

said heating member being located between said pivot mounts of said main articulation bow, said heating member being interposed between said main articulation bow and said wiper blade, said heating element being spaced apart from said wiper blade, said reflector being interposed between said main articulation bow and said heating element;

said mounting brackets of said heating member being detachably coupled to said main articulation bow of said wiper arm; and said heating element providing heat sufficient to melt snow and ice on said wiper blade when powered, said concave inner surface of said reflector being for reflecting heat towards said wiper blade, said reflector comprising aluminum.

\* \* \* \* \*